(12) United States Patent
Yamazaki et al.

(10) Patent No.: US 8,074,531 B2
(45) Date of Patent: Dec. 13, 2011

(54) ELECTRIC POWER STEERING APPARATUS

(75) Inventors: Ryousuke Yamazaki, Kashiwara (JP); Hiroyuki Shigemura, Kashiwara (JP); Shingo Ougita, Nara (JP); Wataru Yamada, Kashiwara (JP)

(73) Assignee: JTEKT Corporation, Osaka (JP)

( * ) Notice: Subject to any disclaimer, the term of this patent is extended or adjusted under 35 U.S.C. 154(b) by 151 days.

(21) Appl. No.: 11/652,652

(22) Filed: Jan. 12, 2007

(65) Prior Publication Data
US 2007/0163374 A1 Jul. 19, 2007

(30) Foreign Application Priority Data
Jan. 13, 2006 (JP) ................................. 2006-006283

(51) Int. Cl.
 F16H 35/00 (2006.01)
 F16H 55/18 (2006.01)
(52) U.S. Cl. ...................................... 74/388 PS; 74/409
(58) Field of Classification Search ................ 74/388 PS, 74/395, 396, 409, 411, 425
See application file for complete search history.

(56) References Cited

U.S. PATENT DOCUMENTS
2004/0164495 A1* 8/2004 Oldenburg ..................... 277/353
2004/0182188 A1* 9/2004 Nakamura et al. .............. 74/409
2007/0158131 A1* 7/2007 Iwasa et al. .................... 180/444

FOREIGN PATENT DOCUMENTS
| EP | 1 714 851 A1 | 10/2006 |
| EP | 1731404 | 12/2006 |
| JP | 9-273560 | 10/1997 |
| JP | 2004-306898 | 11/2004 |
| JP | 2005-254864 | 9/2005 |
| JP | 2006-8008 | 1/2006 |
| WO | WO 2005/073054 A1 | 8/2005 |
| WO | WO 2005073054 A1 * | 11/2005 |

OTHER PUBLICATIONS

An English-language Abstract of JP 2005-254864 (Sep. 22, 2005).

* cited by examiner

Primary Examiner — Thomas R Hannon
Assistant Examiner — Phillip A Johnson
(74) Attorney, Agent, or Firm — Rabin & Berdo, PC (57) ABSTRACT

An electric power steering apparatus comprises a transmission mechanism having a drive gear and a driven gear. One end of the drive gear is supported by a bearing hole in a housing through a bearing and a curved plate spring. The curved plate spring comprises a main body surrounding the bearing and at least one crank-shaped elastic tongue supported by at least one of ends of the main body. A recess formed on an inner peripheral surface of the bearing hole has a bottom and a pair of inner wall surfaces opposed to each other in the circumferential direction of the bearing hole. A relief portion for avoiding contact with a connection portion of the elastic tongue is formed between at least one of the inner wall surfaces and the inner peripheral surface of the bearing hole. A boundary between the relief portion and the inner peripheral surface of the bearing hole is engaged with the main body of the curved plate spring, to restrict the movement of the main body in the circumferential direction.

10 Claims, 7 Drawing Sheets

ELECTRIC POWER STEERING APPARATUS

BACKGROUND OF THE INVENTION

1. Field of the Invention

The present invention relates to an electric power steering apparatus for producing a steering assist force by an electric motor.

2. Description of Related Arts

Electric power steering apparatuses (EPS) for motor vehicles comprise electric motors for steering assist and reduction gear mechanism for amplifying outputs of the electric motors. For example, the electric power steering apparatus arranged in a steering column comprises a worm shaft and a worm wheel meshed with the worm shaft as the reduction gear mechanism. The worm shaft and the worm wheel decelerate the rotation of an output shaft of the electric motor so that an output of the electric motor is amplified. The amplified output of the electric motor is transmitted to a steering mechanism, to assist a steering operation.

An appropriate backlash is provided in mesh between the worm shaft and the worm wheel. However, the backlash may cause the worm shaft to vibrate when a vehicle travels on a bad road, for example, so that a tooth striking sound (rattle sound) may be produced.

In order to prevent the tooth striking sound from being produced, the amount of the backlash must be strictly adjusted within a range of processing accuracy of each of components. When the worm shaft and the worm wheel are assembled, each of the components has been conventionally selected depending on the degree of variation in dimensional accuracy to combine the components whose system accuracies are proper to each other (so-called matching assembling). However, it takes time and labor to perform this working, so that the manufacturing cost is high.

Even if the backlash is set in an appropriate range in the early stages by carrying out the matching assembling, the backlash may be increased due to wear of a tooth portion due to changes with time to produce an abnormal sound.

In the invention disclosed in Japanese Unexamined Patent Publication No. 2005-254864, a curved plate spring is interposed between a bearing for supporting one end of a worm shaft and the inner periphery of a bearing hole formed in a housing. The curved plate spring causes the worm shaft to be elastically urged toward the worm wheel, thereby making a backlash zero.

Specifically, the curved plate spring has an annular main body having ends and covering the outer periphery of an outer ring of the bearing and a pair of hook-shaped elastic tongues supported in a cantilevered shape by each of the ends of the main body. The tip of each of the elastic tongues is elastically deflected by being abutted against the bottom of a recess of the bearing hole. The worm shaft is urged toward the worm wheel through the bearing by a repulsive force of the deflection.

A base end of each of the elastic tongues is abutted against an edge of an inlet to the recess of the bearing hole, thereby regulating the rotation of the curved plate spring.

In the invention disclosed in the above-mentioned gazette, however, a stress caused by the deflection of the elastic tongue is the highest at the base end of the elastic tongue. Further, a load stress for regulating rotation is added to the base end. Consequently, an excess stress is applied to a part of the curved plate spring, particularly to the base end. As a result, the durability of the curved plate spring may be degraded.

An object of the present invention is to provide an electric power steering apparatus capable of preventing noises from being produced over a long time period.

SUMMARY OF THE INVENTION

In order to attain the above-mentioned object, in a preferable aspect of the present invention, an electric power steering apparatus comprises a transmission mechanism for transmitting the power of an electric motor for steering assist to a steering mechanism, a housing accommodating the transmission mechanism, a bearing, and a curved plate spring. The transmission mechanism comprises a drive gear and a driven gear meshed with the drive gear. The bearing rotatably supports one end in the axial direction of the drive gear. The housing has a bearing hole formed therein for supporting the bearing so as to be capable of being biased in a direction in which a center-to-center distance between the drive gear and the driven gear is changed. The curved plate spring elastically urges the drive gear through the bearing in a direction in which the center-to-center distance is shortened.

A recess is formed on an inner peripheral surface of the bearing hole in the housing. The recess has a bottom and a pair of inner wall surfaces opposed to each other in a circumferential direction of the bearing hole. The curved plate spring comprises an annular main body surrounding the bearing and having a pair of ends in the circumferential direction and at least one elastic tongue supported in a cantilevered shape by at least one of the ends of the main body. The elastic tongue has a base end connected to the main body, a pressing portion for elastically pressing the bottom of the recess, and a connection portion for connecting the base end and the pressing portion, to have a crank shape.

A relief portion for avoiding contact with the connection portion of the elastic tongue is formed between at least one of the inner wall surfaces of the recess and the inner peripheral surface of the bearing hole. A boundary between the relief portion and the inner peripheral surface of the bearing hole is engaged with the main body of the curved plate spring, to regulate the movement in the circumferential direction of the main body.

According to the present embodiment, the elastic tongue in a cantilevered shape for urging is deformed due to bending with the base end as its support, so that the maximum bending stress is created at the base end of the elastic tongue. The main body of the curved plate spring is engaged (brought into contact with) the edge of the recess at a position spaced a predetermined distance apart from the base end in the circumferential direction of the main body, thereby restricting the movement in the circumferential direction of the curved plate spring. Consequently, a stress created in the curved plate spring due to the restriction of the movement in the circumferential direction of the curved plate spring is prevented from being added in a superimposed manner to the base end of the elastic tongue at which the maximum bending stress is created. As a result, the stress created in the curved plate spring is prevented from concentrating, thereby allowing durability to be improved.

DETAILED DESCRIPTION OF THE PREFERRED EMBODIMENT

Referring now to the drawings, embodiments of the present invention will be specifically described.

Figure 1:
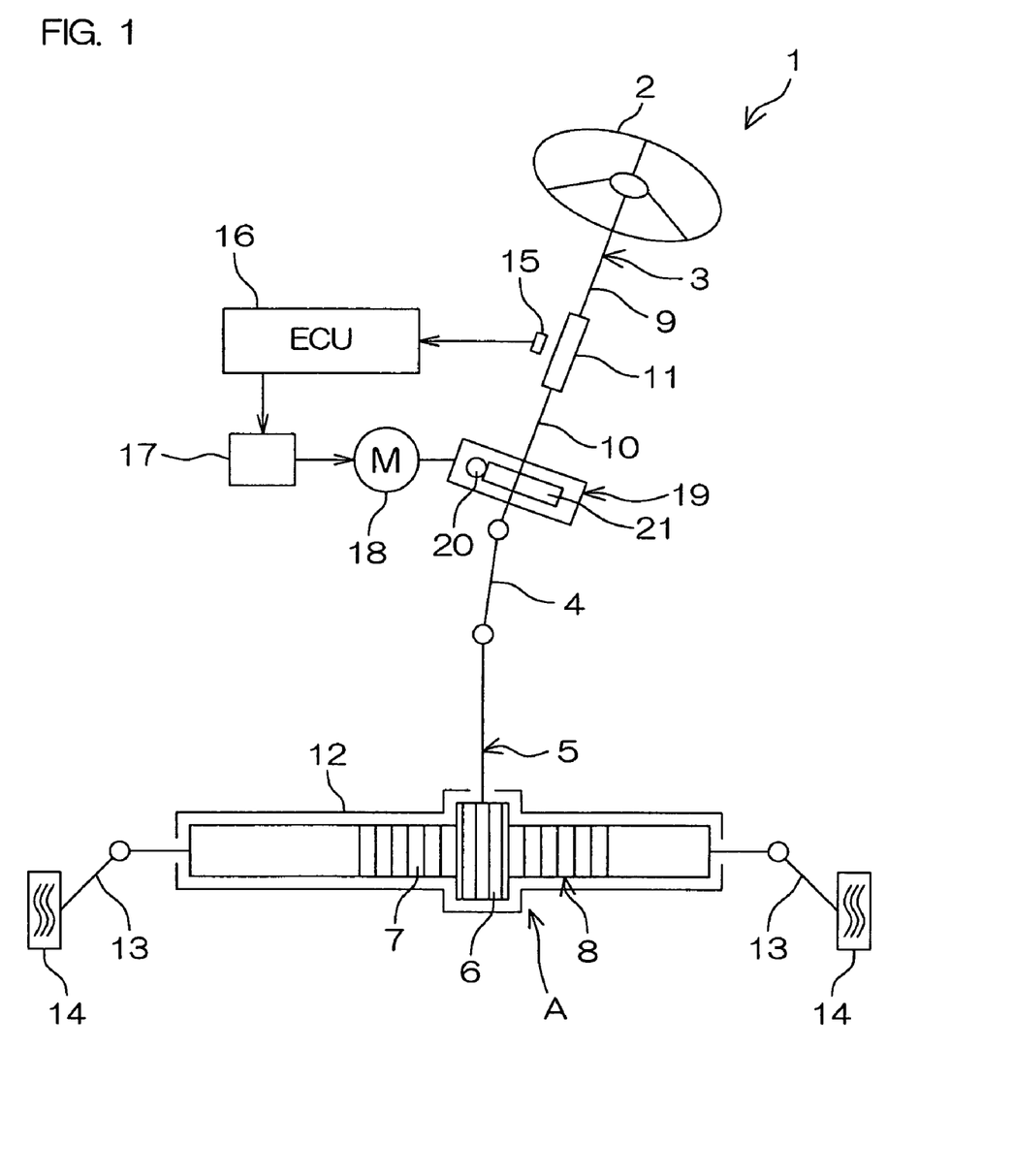
FIG. 1 is a schematic view showing the schematic configuration of an electric power steering apparatus according to an embodiment of the present invention.

FIG. 1 is a schematic view showing the schematic configuration of an electric power steering apparatus 1 according to an embodiment of the present invention. Referring to FIG. 1, the electric power steering apparatus 1 comprises a steering shaft 3 connected to a steering member 2 such as a steering wheel, a pinion shaft 5 connected to the steering shaft 3 through an intermediate shaft 4, and a rack bar 8 serving as a steerable shaft, having a rack 7 meshed with a pinion 6 formed on the pinion shaft 5 and extending in a right-and-left direction of an automobile. The pinion shaft 5 and the rack bar 8 constitute a rack-and-pinion mechanism A serving as a steering mechanism.

The steering shaft 3 comprises an input shaft 9 connected to the steering member 2 and an output shaft 10 communicating with the pinion shaft 5. The input shaft 9 and the output shaft 10 are connected to each other so as to be relatively rotatable on the same axis through a torsion bar 11.

The rack bar 8 is supported on a housing 12 so as to be linearly movable back and forth through a plurality of bearings (not shown). Both ends of the rack bar 8 project toward both the sides of the housing 12, and a steerable wheel 14 is connected to each of the ends through a tie rod 13 and a knuckle arm (not shown).

When the steering member 2 is operated, the steering shaft 3 is rotated. The rotation of the steering shaft 3 is converted into linear reciprocating motion, in a right-and-left direction of the vehicle body, of the rack bar 8 through the pinion 6 and the rack 7. Consequently, the steering of the steering wheel 14 is achieved.

A torque sensor 15 is provided in the vicinity of the steering shaft 3. The torque sensor 15 detects a steering torque applied to the steering member 2 on the basis of the amount of relative rotational displacement between the input shaft 9 and the output shaft 10. The torque value detected by the torque sensor 15 is given to an ECU (Electronic Control Unit) 16. The ECU 16 controls the driving of an electric motor 18 for steering assist through a driving circuit 17 on the basis of the above-mentioned torque value, a vehicle speed given from a vehicle speed sensor (not shown), and the like.

A rotating force of the electric motor 18 outputted by control from the ECU 16 is amplified by a reduction gear mechanism 19, and is transmitted to the output shaft 10 of the steering shaft 3. The force transmitted to the output shaft 10 is transmitted to the rack bar 8 through the pinion shaft 5. This causes steering to be assisted.

Figure 2:
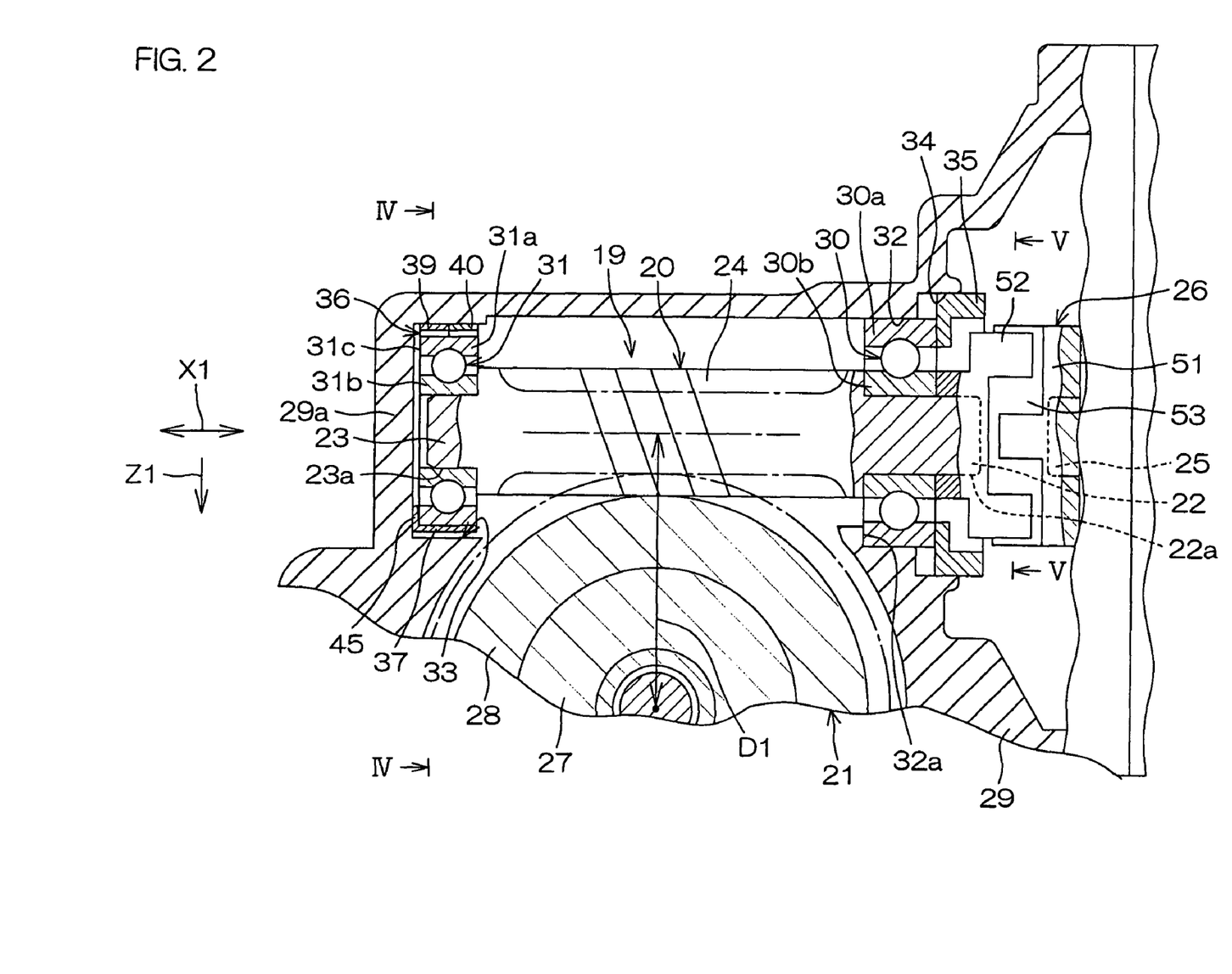
FIG. 2 is a cross-sectional view showing the configuration of a reduction gear mechanism serving as a transmission mechanism provided in the electric power steering apparatus shown in FIG. 1 and its vicinity.

FIG. 2 is a cross-sectional view showing the configuration of the reduction gear mechanism 19 provided in the electric power steering apparatus 1 shown in FIG. 1 and its vicinity. Referring to FIG. 2, the reduction gear mechanism 19 comprises a worm shaft 20 serving as a drive gear rotated and driven by the electric motor 18 and a worm wheel 21 serving as a driven gear meshed with the worm shaft 20.

The worm shaft 20 has a first end 22 and a second end 23. A worm 24 is formed in an intermediate area between the first end 22 and the second end 23 of the worm shaft 20. The first end 22 is coaxially connected to an output shaft 25 of the electric motor 18 through a power transmission joint 26. This causes an output of the electric motor 18 to be transmitted to the worm shaft 20. The worm shaft 20 is made axially movable by the power transmission joint 26 and swingable around the power transmission joint 26.

The worm wheel 21 comprises an annular cored bar 27 coupled to the output shaft 10 so as to be rotatable together and a synthetic resin member 28 surrounding the cored bar 27 and having teeth formed on its outer periphery. The cored bar 27 is inserted into a mold at the time of resin molding of the synthetic resin member 28, for example. The cored bar 27 is fitted in and coupled to the output shaft 10 of the steering shaft 3 by press fitting, for example. This causes the worm wheel 21 to be rotatable together with the output shaft 10 and axially immovable. The worm shaft 20 and the worm wheel 21 are accommodated in a housing 29.

A first bearing 30 is arranged at the first end 22 of the worm shaft 20. Further, a second bearing 31 is arranged at the second end 23 of the worm shaft 20. The worm shaft 20 is supported on the housing 29 through the first and second bearings 30 and 31 so as to be rotatable. An example of the first and second bearings 30 and 31 is a rolling bearing.

An inner ring 30b of the first bearing 30 is fitted in an outer periphery 22a of the first end 22, and an outer ring 30a of the first bearing 30 is supported by a first bearing hole 32 in the housing 29. The outer ring 30a is held in an axial direction X1 of the worm shaft 20 by a step 32a formed at one end of the first bearing hole 32 and a screw member 35 screwed into a hole 34 communicating with the first bearing hole 32.

On the other hand, an inner ring 31b of the second bearing 31 is fitted in an outer periphery 23a of the second end 23, and an outer ring 31a of the second bearing 31 is supported by a second bearing hole 33 in the housing 29 through a curved plate spring 36.

Figure 3:
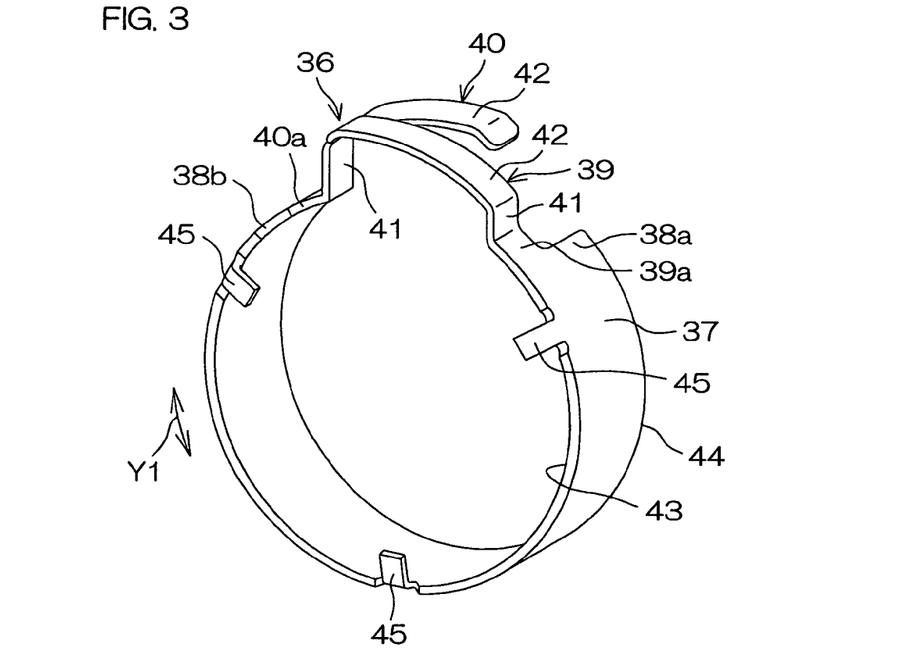
FIG. 3 is a perspective view of a curved plate spring.
Figure 4:
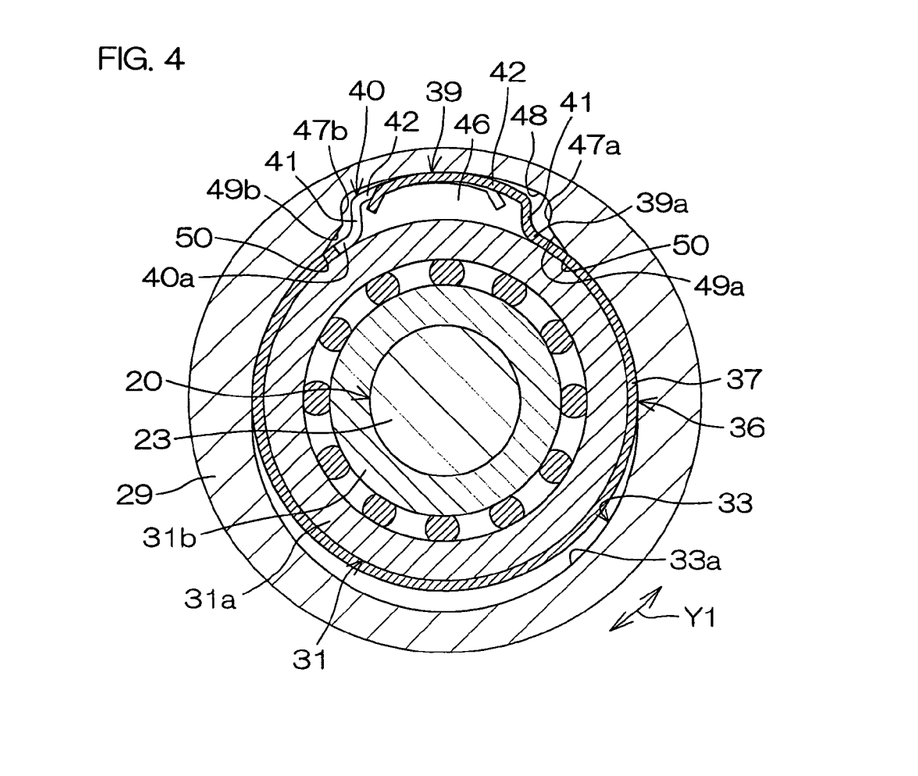
FIG. 4 is a cross-sectional view taken along a line IV-IV shown in FIG. 2.

FIG. 3 is a perspective view of the curved plate spring 36, and FIG. 4 is a cross-sectional view taken along a line IV-IV shown in FIG. 2. Referring to FIG. 3, the curved plate spring 36 has an annular shape having ends in the circumferential direction, and is formed of stainless steel or spring steel. The curved plate spring 36 has a main body 37 and first and second elastic tongues 39 and 40 in a hook shape (L shape).

The main body 37 of the curved plate spring 36 has an annular shape surrounding the outer ring 31a of the second bearing 31 and has first and second ends 38a and 38b in a circumferential direction Y1. The first elastic tongue 39 is supported in a cantilevered shape by the first end 38a of the main body 37, and the second elastic tongue 40 is supported in a cantilevered shape by the second end 38b of the main body 37.

The first and second elastic tongues 39 and 40 extend from the main body 37. The first elastic tongue 39 has a base end 39a connected to the first end 38a of the main body 37, a pressing portion 42 for elastically pressing the bottom 48 of a recess 46 formed on an inner peripheral surface 33a of the second bearing hole 33, and a connection portion 41 for connecting the base end 39a and the pressing portion 42 to each other, to have a crank shape.

Similarly, the second elastic tongue 40 has a base end 40a connected to the second end 38b of the main body 37, the pressing portion 42 for elastically pressing the bottom 48 of the recess 46, and the connection portion 41 for connecting the base end 40a and the pressing portion 42 to each other, to have a crank shape.

Each of the base ends 39a and 40a extends generally along the circumferential direction Y1 of the main body 37. Each of the connection portions 41 extends orthogonally outward from the corresponding base end 39a or 40a. Each of the pressing portions 42 extends orthogonally from an end of the corresponding connection portion 41, and has a circular arc shape generally concentric with the main body 37.

The widths of the first and second elastic tongues 39 and 40 are made smaller than the width of the main body 37 in the axial direction of the curved plate spring 36.

The first and second elastic tongues 39 and 40 extend in opposite directions from the main body 37, respectively. Further, the first and second elastic tongues 39 and 40 are arranged in the positions shifted from each other in the axial direction of the main body 37. Specifically, the first elastic tongue 39 is arranged at one side end 43 of the main body 37, and the second elastic tongue 40 is arranged at the other side end 44. Specifically, the first and second elastic tongues 39 and 40 are alternately arranged.

A plurality of elastic projections 45 are provided at the one side end 43 of the main body 37. The plurality of elastic projections 45 are extended in an inclined shape inward in the radial direction of the main body 37 from the one side end 43 and disposed in an equally spaced relation in the circumferential direction Y1 of the main body 37. Each of the elastic projections 45 is abutted against an end surface 31c of the outer ring 31a of the second bearing 31 (see FIG. 2).

A state where the second bearing 31 and the curved plate spring 36 are supported by the second bearing hole 33 will be then described.

Referring to FIGS. 2 and 4, the above-mentioned recess 46 is formed on the opposite side of the worm wheel 21 on the inner peripheral surface 33a of the second bearing hole 33. The recess 46 has a pair of inner wall surfaces 47a and 47b opposed to each other in the circumferential direction, the bottom 48, and a pair of relief portions 49a and 49b provided in correspondence with an inlet to the recess 46. The relief portions 49a and 49b are respectively composed of chambers for connecting the respective corresponding inner wall surfaces 47a and 47b and the inner peripheral surface 33a of the second bearing hole 33 to each other in an inclined shape.

A boundary 50 between each of the relief portions 49a and 49b and the inner peripheral surface 33a of the second bearing hole 33 corresponds to an edge of the inlet to the recess 46 in the circumferential direction of the second bearing hole 33. By providing the pair of relief portions 49a and 49b, the boundaries 50 corresponding to the edge are respectively spaced apart from the base ends 39a and 40a of the corresponding first and second elastic tongues 39 and 40 in the circumferential direction Y1 of the main body 37.

The second bearing 31 is supported so as to be capable of being biased in a direction in which a center-to-center distance D1 between the worm shaft 20 and the worm wheel 21 is lengthened and shortened. Further, the curved plate spring 36 is interposed between the outer periphery of the outer ring 31a of the second bearing 31 and the inner peripheral surface 33a of the second bearing hole 33.

The pressing portion section 42 of each of the first and second elastic tongues 39 and 40 is elastically deformed by being received by the bottom 48 of the recess 46. Correspondingly, the pressing portions 42 of the first and second elastic tongues 39 and 40, bending portions between the pressing portions 42 and the connection portion 41, and bending portions between the connection portion 41 and the base ends 39a and 40a are elastically deformed. The curved plate spring 36 elastically urges the worm shaft 20 through the second bearing 31 in a direction Z1 in which the center-to-center distance D1 is shortened, by a repulsive force of each of the first and second elastic tongues 39 and 40 for the elastic deformation of the bending portion or the like. This causes a backlash between the worm shaft 20 and the worm wheel 21 to remain zero.

The first and second elastic tongues 39 and 40 are elastically deformed due to bending, respectively, with the base ends 39a and 40a as their supports due to pressing by the pressing portions 42, so that the maximum bending stress is created at each of the base ends 39a and 40a.

On the other hand, the boundaries 50 corresponding to the edge of the inlet to the recess 46 are respectively spaced a predetermined distance apart from the base ends 39a and 40a of the corresponding first and second elastic tongues 39 and 40 in the circumferential direction Y1 of the main body 37.

That is, in a case where a force in the circumferential direction Y1 is applied to the curved plate spring 36, a portion, spaced a predetermined distance apart from each of the base ends 39a and 40b, of the main body 37 is engaged with the boundary 50 serving as the edge, so that the movement of the curved plate spring 36 in the circumferential direction Y1 is restricted.

That is, a stress caused by regulating the movement of the curved plate spring 36 in the circumferential direction Y1 is created in the portion, spaced the predetermined distance apart from each of the base ends 39a and 40a, of the main body 37. Consequently, the stress created in the curved plate spring 36 due to the regulation of the movement of the curved plate spring 36 in the peripheral direction Y1 can be prevented from being added in a superimposed manner to the base ends 39a and 40a of the first and second elastic tongues 39 and 40 at which the maximum bending stress is created by an urging reaction force.

The plurality of elastic projections 45 of the curved plate spring 36 are elastically deformed in the axial direction X1 between the one end surface 31c of the second bearing 31 and an end wall 29a of the housing 29 opposed to the one end surface 31c of the second bearing 31, as shown in FIG. 2. A restoring force corresponding to the elastic deformation causes the curved plate spring 36 to urge the worm shaft 20 toward the electric motor 18 in the axial direction X1 through the second bearing 31.

Figure 5:
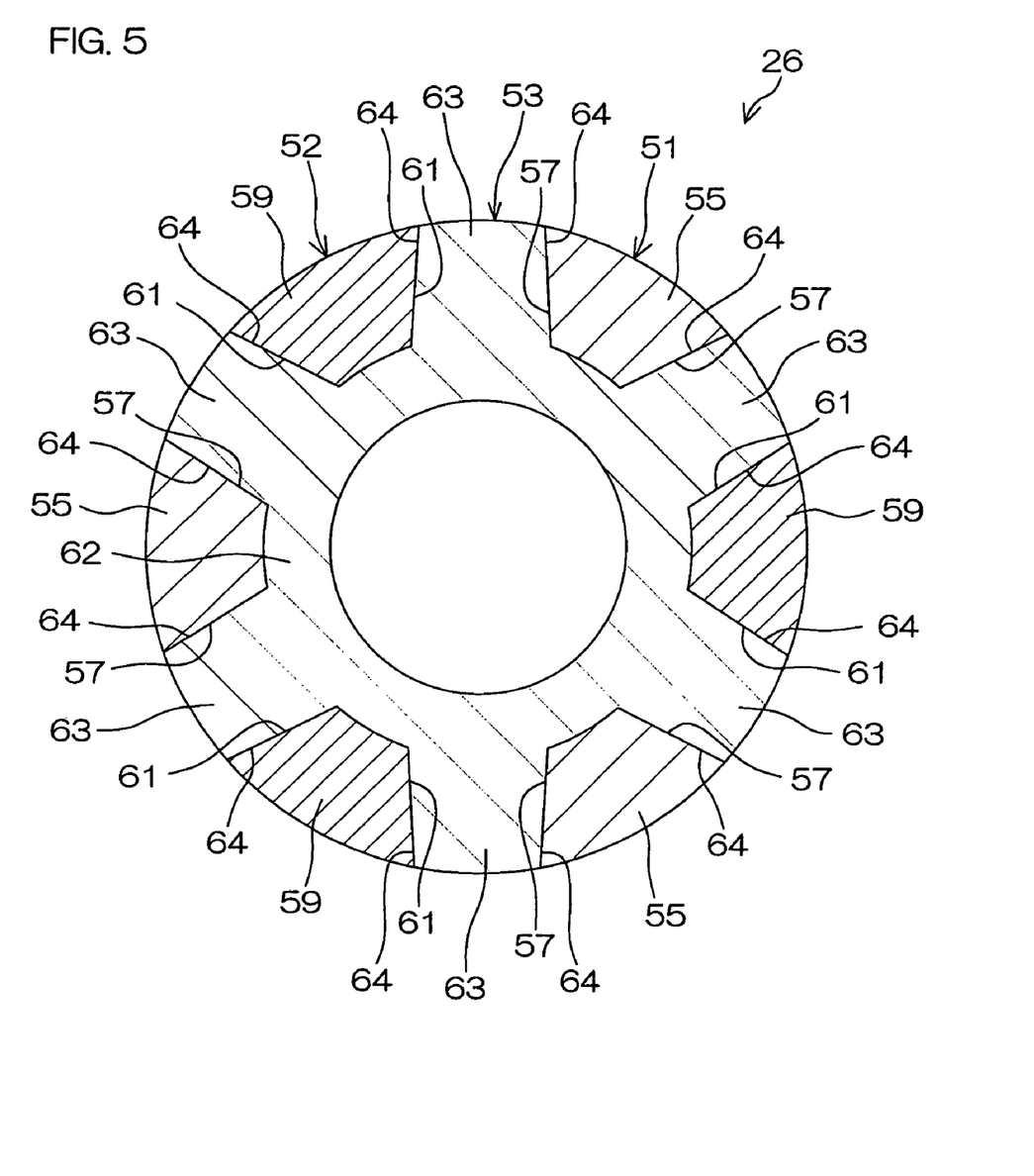
FIG. 5 is a cross-sectional view taken along a line V-V shown in FIG. 2.
Figure 6:
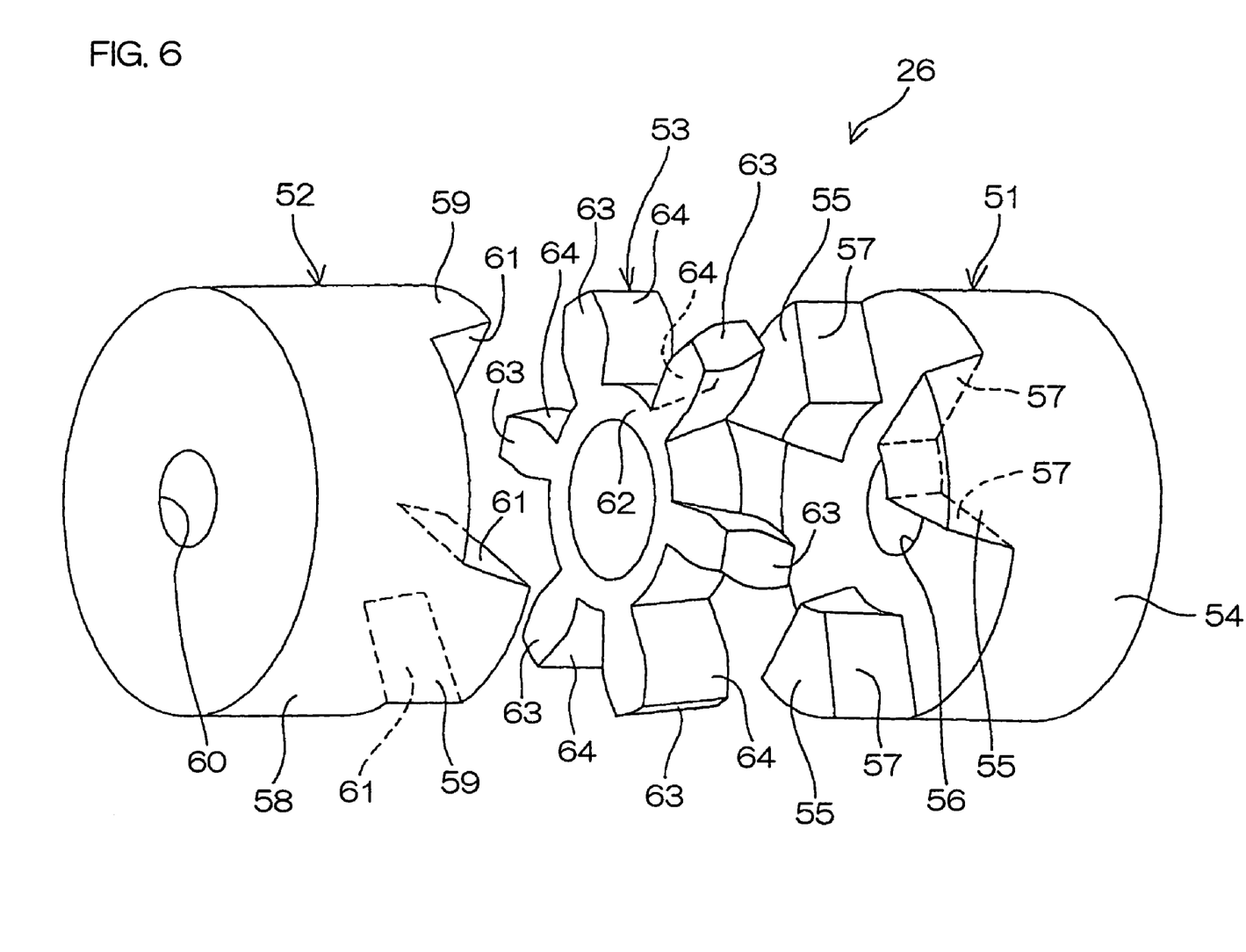
FIG. 6 is an exploded perspective view of a power transmission joint.

The power transmission joint 26 will be then described.
FIG. 5 is a cross-sectional view taken along a line V-V shown in FIG. 2, and FIG. 6 is an exploded perspective view of the power transmission joint 26. Referring to FIG. 2, the power transmission joint 26 comprises a first engagement member 51 connected to the output shaft 25 of the electric motor 18 so as to be rotatable together, a second engagement member 52 connected to the first end 22 of the worm shaft 20 of the reduction gear mechanism 19 so as to be rotatable together, and an elastic member 53 interposed between the first and second engagement members 51 and 52 for transmitting a torque from the first engagement member 51 to the second engagement member 52.

Referring to FIG. 6, the first engagement member 51 is formed of a metal, for example, and has a first main body 54 having an annular shape and a plurality of first engagement projections 55 projecting from one end surface in the axial direction of the first main body 54. A first fitting hole 56 for being fitted by the output shaft 25 of the electric motor 18 is formed in the first main body 54, and the first engagement projections 55 are equally spaced in the circumferential direction of the first main body 54. Further, the first engagement projection 55 has a pair of power transmission surfaces 57 opposed to each other in the circumferential direction of the first main body 54.

The second engagement member 52 is formed of a metal, for example, and has an annular second main body 58 and a plurality of second engagement projections 59 projecting from one end surface in the axial direction of the second main body 58. A second fitting hole 60 for being fitted by the first end 22 of the worm shaft 20 is formed in the second main body 58, and the second engagement projections 59 are equally spaced in the circumferential direction of the second main body 58. Further, the second engagement projection 59 has a pair of power transmission surfaces 61 opposed to each other in the circumferential direction of the second main body 58.

The elastic member 53 is formed of synthetic rubber or synthetic resin, for example, and has an annular main body 62 and a plurality of engagement arms 63 extending in a radial direction from a peripheral surface of the main body 62. The plurality of engagement arms 63 are equally spaced in the circumferential direction of the main body 62, and each of the engagement arms 63 has a pair of power transmission surfaces 64 opposed to each other in the circumferential direction of the main body 62.

The first engagement member 51, the second engagement member 52, and the elastic member 53 are so assembled that the first engagement projection 55, the second engagement projection 59, and the engagement arm 63 are respectively meshed with each other, as shown in FIG. 5. Specifically, the first engagement projection 55 and the second engagement projection 59 are meshed with each other with the engagement arm 63 sandwiched therebetween in the circumferential direction. Further, the power transmission surface 57 of the first engagement member 51 and the power transmission surface 61 of the second engagement member 52 are respectively abutted against the power transmission surfaces 64 of the elastic member 53. This causes the output of the electric motor 18 to be transmitted to the worm shaft 20 through the power transmission joint 26.

As described in the foregoing, according to the present embodiment, the recess 46 of the second bearing hole 33 is provided with the pair of relief portions 49*a* and 49*b*, thereby allowing an area of a stress created in the curved plate spring 36 due to urging of the worm shaft 20 toward the worm wheel 21 and an area of a stress created in the curved plate spring 36 due to regulation of the movement of the curved plate spring 36 in the circumferential direction Y1 to differ from each other. This can prevent an excess stress from being applied to a part of the curved plate spring 36 and prevent the durability of the curved plate spring 36 from being degraded. Consequently, noises can be prevented from occurring in the electric power steering apparatus 1 with a backlash between the worm shaft 20 and the worm wheel 21 remaining zero over a long time period.

Figure 7:
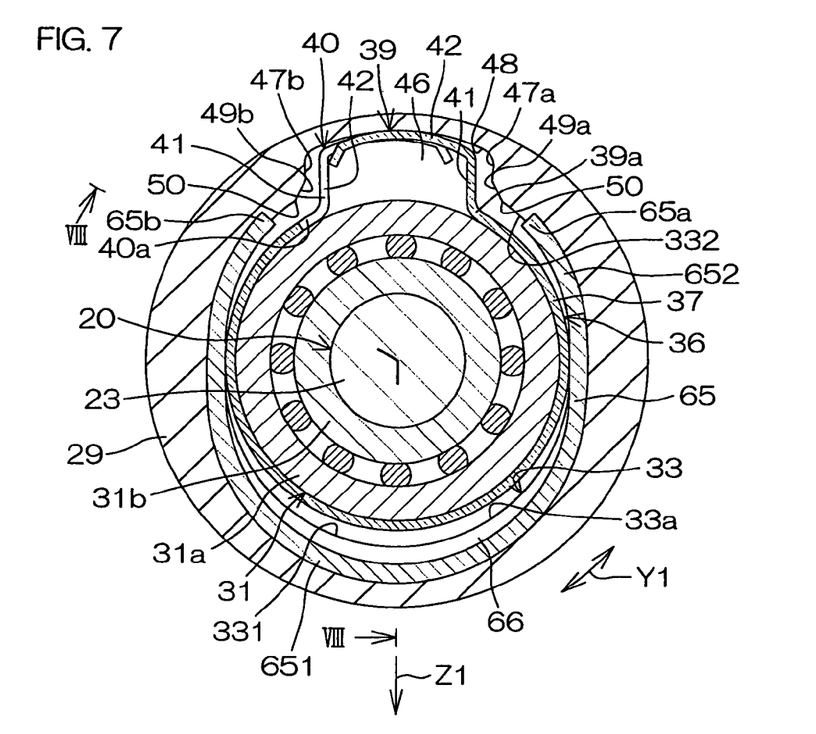
FIG. 7 is a cross-sectional view of a principal part of an electric power steering apparatus according to another embodiment of the present invention.
Figure 8:
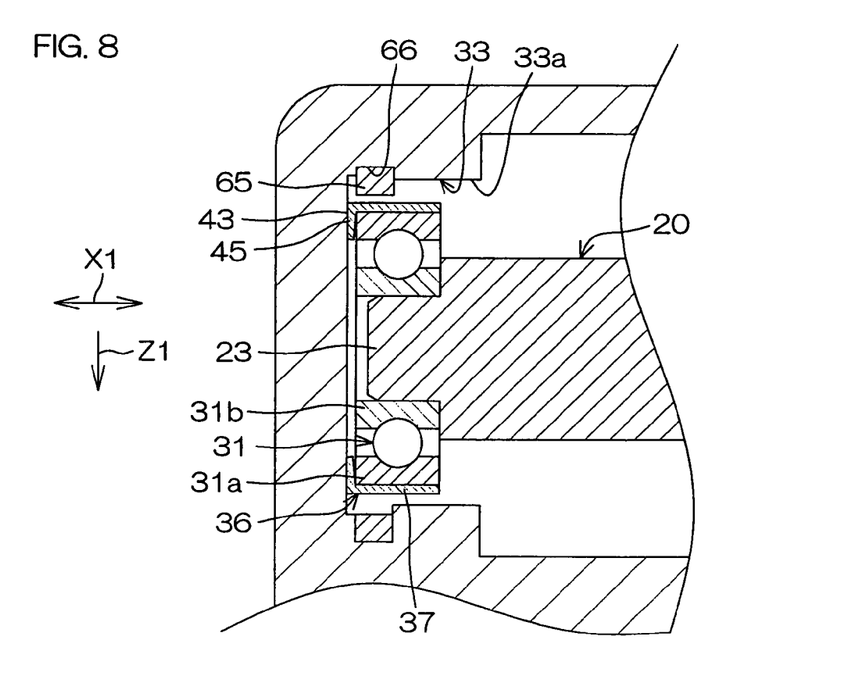
FIG. 8 is a cross-sectional view taken along a line VIII-VIII shown in FIG. 7.

FIG. 7 is a cross-sectional view of a principal part of an electric power steering apparatus 1 according to another embodiment of the present invention, and FIG. 8 is a cross-sectional view taken along a line VIII-VIII shown in FIG. 7. In FIGS. 7 and 8, components identical to the components shown in FIGS. 2 to 4, described above, are assigned identical reference numerals to those in FIGS. 2 to 4 and hence, the description thereof is not repeated.

Referring to FIGS. 7 and 8, the present embodiment mainly differs from the above-mentioned embodiment in that an elastic member 65 formed of synthetic rubber, synthetic resin, or the like, for example, is interposed between the outer periphery of a main body 37 of a curved plate spring 36 and an inner peripheral surface 33*a* of a second bearing hole 33. The elastic member 65 has an annular shape and has a pair of ends 65*a* and 65*b* in the circumferential direction.

The elastic member 65 is held in a groove 66 formed on the inner peripheral surface 33*a* of the second bearing hole 33 with circumferential movement and axial movement thereof regulated. The pair of ends 65*a* and 65*b* of the elastic member 65 are spaced a predetermined distance apart from each other with first and second elastic tongues 39 and 40 sandwiched therebetween in a circumferential direction Y1. The ends 65*a* and 65*b* do not respectively interfere with the corresponding elastic tongues 39 and 40.

The inner peripheral surface 33*a* of the second bearing hole 33 includes a first half 331 on the side of a worm wheel 21 (a lower half in FIG. 7) and a second half 332 on the opposite side of the worm wheel 21 (an upper half in FIG. 7) in the circumferential direction of the second bearing hole 33. A portion 651, corresponding to the first half 331, of the elastic member 65 is accommodated in the groove 66 so as not to project inward in the radial direction of the second bearing hole 33. On the other hand, a portion 652, corresponding to the second half 332, of the elastic member 65 is accommodated in the groove 66 so as to partially project inward in the radial direction of the second bearing hole 33.

According to the present embodiment, the same effect as that in the above-mentioned embodiment can be produced. Further, in a case where a worm shaft 20, a second bearing 31, and the curved plate spring 36 are pushed back due to the reaction force from the worm wheel 21 in the opposite direction of a direction Z1 in which the above-mentioned center-to-center direction is shortened, the elastic member 65 can prevent the main body 37 of the curved plate spring 36 and the inner peripheral surface 33*a* of the second bearing hole 33 from coming into direct contact with each other. This can prevent a striking sound due to metal contact between the main body 37 of the curved plate spring 36 and the inner peripheral surface 33*a* of the second bearing hole 33 from being produced and can prevent noises from being produced.

The elastic member 65 may be held in the groove 66 formed on the second bearing hole 33, as described above, or may be fixed to the outer periphery of the main body 37 of the curved plate spring 36 with curing adhesion or other adhesion, for example. Alternatively, the groove 66 may be abolished to fix the elastic member 65 to the inner peripheral surface 33*a* of the second bearing hole 33 with curing adhesion and other adhesion, for example.

Figure 9:
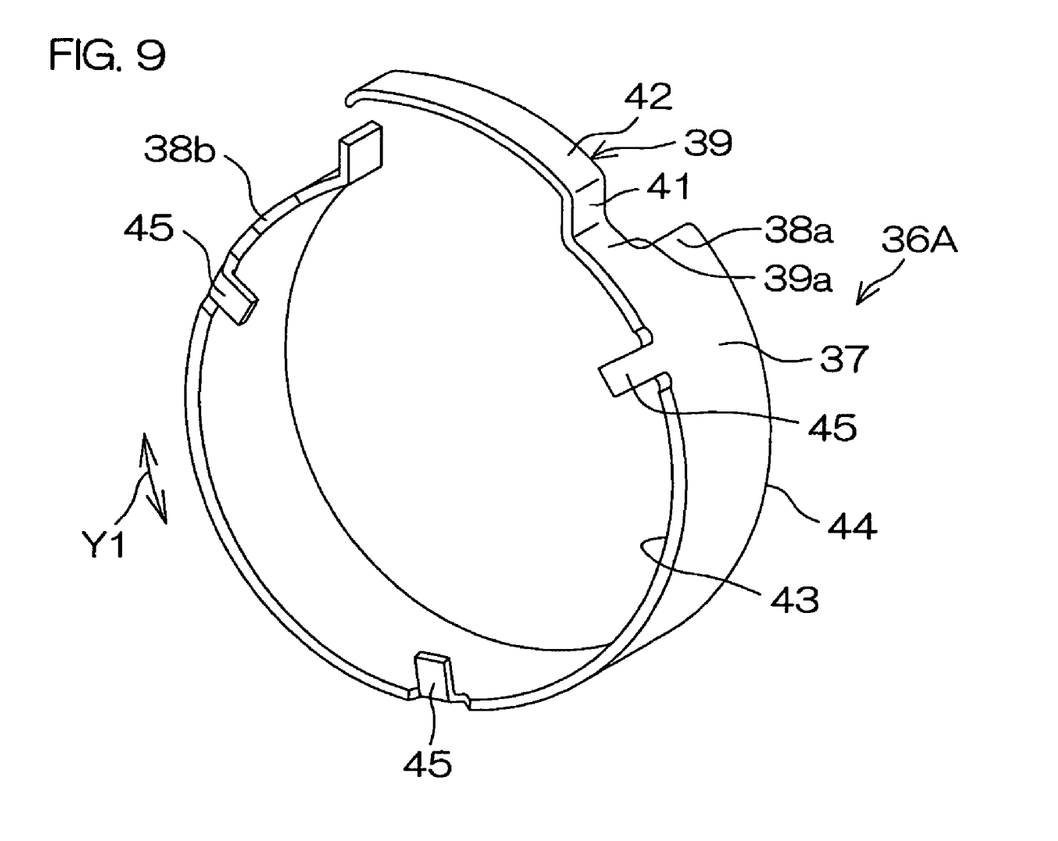
FIG. 9 is a perspective view of a curved plate spring in still another embodiment of the present invention.

The present invention is not limited to the contents of the foregoing embodiments. For example, a curved plate spring 36A may be of such a so-called half-claw type that it has only either one of the first and second elastic tongues 39 and 40 (the first elastic tongue 39 in an example shown in FIG. 9). In this case, a relief section of a recess may be provided in only an area corresponding to the elastic tongue.

Although the present invention has been described and illustrated in detail by the specific aspects, it is understood that a parson skilled in the art would easily anticipate modification, alteration and equivalents thereof, therefore, the spirit and scope of the present invention are limited only by the terms of the appended claims and their equivalents.

The present application corresponds to the Japanese Patent Application No. 2006-6283 filed with the Japanese Patent Office on Jan. 13, 2006, the disclosure of which is herein incorporated by reference.

What is claimed is:

1. An electric power steering apparatus, comprising:
a transmission mechanism for transmitting power of an electric motor for steering assist to a steering mechanism, the transmission mechanism comprising a drive gear and a driven gear meshed with the drive gear;
a bearing for rotatably supporting one end in an axial direction of the drive gear;
a housing accommodating the transmission mechanism, the housing having a bearing hole formed therein for supporting the bearing so that the bearing can be biased in a direction in which a center-to-center distance between the drive gear and the driven gear is changed; and
a curved plate spring for elastically urging the drive gear through the bearing in a direction in which the center-to-center distance is shortened, the curved plate spring including an annular main body surrounding the bearing, a pair of ends extending in a circumferential direction of the main body, and at least one elastic tongue supported in a cantilevered shape by at least one of the pair of ends of the main body,
wherein a recess is formed on a first part of an inner peripheral surface of the bearing hole in the housing,
the recess has a bottom and a pair of inner wall surfaces opposed to each other in a circumferential direction of the bearing hole,
the elastic tongue has a base end connected to the main body, a pressing portion for elastically pressing the bottom of the recess, and a connection portion for connecting the base end and the pressing portion to each other, to have a crank shape,
a relief portion, which avoids contact with the connection portion of the elastic tongue and the annular main body of the curved plate spring, is formed between at least one of the inner wall surfaces of the recess and the first part of the inner peripheral surface of the bearing hole, and includes a chamfer connecting the at least one of the inner wall surfaces of the recess and the first part of the inner peripheral surface of the bearing hole to each other,
a boundary between the relief portion and the inner peripheral surface of the bearing hole is engaged with the main body of the curved plate spring, to substantially prevent the movement of the main body in a circumferential direction thereof,
a surface of the relief portion, and the inner peripheral surface of the bearing hole at the boundary intersect each other to form a second recess adjacent to the recess,
a gap is formed between the annular main body of the curved plate spring and a second part of the inner peripheral surface of the bearing hole, and the second part is substantially opposed to the first part,
the connection portion of the elastic tongue is spaced apart from the at least one of the inner wall surfaces of the recess in a circumferential direction of the bearing hole, and
the boundary is engaged with an engaged portion of the main body, the engaged portion being located at an end of the chamfer and spaced apart from the base end of the elastic tongue in the circumferential direction so as to substantially prevent the movement of the main body in the circumferential direction thereof.

2. The electric power steering apparatus according to claim 1, wherein
the base end of the elastic tongue generally extends in the circumferential direction of the main body, and
a width of the base end of the elastic tongue is smaller than a width of the main body in an axial direction of the main body.

3. The elastic power steering apparatus according to claim 1, wherein an annular elastic member having a pair of ends in a circumferential direction thereof is interposed between an outer periphery of the main body of the curved plate spring and the inner peripheral surface of the bearing hole.

4. The electric power steering apparatus according to claim 3, wherein the elastic tongue of the curved plate spring is arranged between the pair of ends of the elastic member.

5. The electric power steering apparatus according to claim 3, wherein a groove extending in a circumferential direction of the bearing hole and accommodating a part of the elastic member is formed on the inner peripheral surface of the bearing hole.

6. The electric power steering apparatus according to claim 5, wherein
the inner peripheral surface of the bearing hole includes a first half on a side of the driven gear and a second half on the opposite side of the driven gear in the circumferential direction of the bearing hole,
a portion, corresponding to the first half, of the elastic member is accommodated in the groove so as not to project inward in a radial direction of the bearing hole, and
a portion, corresponding to the second half, of the elastic member is accommodated in the groove so as to partially project inward in the radial direction of the bearing hole.

7. The electric power steering apparatus according to claim 1, wherein the drive gear comprises a worm shaft, and the driven gear comprises a worm wheel.

8. The electric power steering apparatus according to claim 1, wherein a stress created in the curved plate spring due to a restriction of the movement in the circumferential direction of the curved plate spring is prevented from being added in a superimposed manner to the base end of the elastic tongue at which a maximum bending stress is created.

9. The electric power steering apparatus according to claim 8, wherein the elastic tongue is deformed due to bending with the base end thereof, so that the maximum bending stress is created at the base end of the elastic tongue.

10. An electric power steering apparatus, comprising:
a transmission mechanism for transmitting power of an electric motor for steering assist to a steering mechanism, the transmission mechanism comprising a drive gear and a driven gear meshed with the drive gear;
a bearing for rotatably supporting one end in an axial direction of the drive gear;
a housing accommodating the transmission mechanism, the housing having a bearing hole formed therein for supporting the bearing so that the bearing can be biased in a direction in which a center-to-center distance between the drive gear and the driven gear is changed; and
a curved plate spring for elastically urging the drive gear through the bearing in a direction in which the center-to-center distance is shortened, the curved plate spring including an annular main body surrounding the bearing, a pair of ends extending in a circumferential direction of the main body, and at least one elastic tongue supported in a cantilevered shape by at least one of the pair of ends of the main body, wherein a recess is formed on a first part of an inner peripheral surface of the bearing hole in the housing, the recess has a bottom and a pair of inner wall surfaces opposed to each other in a circumferential direction of the bearing hole, the elastic tongue has a base end connected to the main body, a pressing portion for elastically pressing the bottom of the recess, and a connection portion for connecting the base end and the pressing portion to each other, to have a crank shape, a chamfer, formed on at least one of the inner wall surfaces of the recess and connecting the at least one of the inner wall surfaces of the recess and the first part of the inner peripheral surface of the bearing hole to each other, a gap is formed between the annular main body of the curved plate spring and a second part of the inner peripheral surface of the bearing hole, and the second part is substantially opposed to the first part, the connection portion of the elastic tongue is spaced apart from at least one of the inner wall surfaces of the recess in a circumferential direction of the bearing hole, and the inner peripheral surface of the bearing hole is engaged with an engaged portion of the main body to restrict a movement of the main body in the circumferential direction, the engaged portion being located at an end of the chamfer and spaced apart from the base end of the elastic tongue in the circumferential direction so that the connection portion of the elastic tongue is maintained to be spaced apart from the at least one of the inner wall surfaces of the recess and the movement of the main body is substantially prevented.

* * * * *